US012729751B2

(12) United States Patent
Bacon et al.

(10) Patent No.: US 12,729,751 B2
(45) Date of Patent: Sep. 8, 2026

(54) DRIVE MECHANISM

(71) Applicant: Herkules Equipment Corporation, Walled Lake, MI (US)

(72) Inventors: Todd John Bacon, Northville, MI (US); Eliana Virginia Podolski Bacon, Northville, MI (US)

(73) Assignee: Herkules Equipment Corporation, Walled Lake, MI (US)

( * ) Notice: Subject to any disclaimer, the term of this patent is extended or adjusted under 35 U.S.C. 154(b) by 350 days.

(21) Appl. No.: 18/367,836

(22) Filed: Sep. 13, 2023

(65) Prior Publication Data

US 2024/0084878 A1 Mar. 14, 2024

Related U.S. Application Data

(60) Provisional application No. 63/406,111, filed on Sep. 13, 2022.

(51) Int. Cl.
*F16H 19/06* (2006.01)
*B66F 3/44* (2006.01)

(52) U.S. Cl.
CPC ............... *F16H 19/06* (2013.01); *B66F 3/44* (2013.01)

(58) Field of Classification Search
CPC .... F16H 19/003; F16H 19/005; F16H 19/006; F16H 19/06; F16H 19/0604; F16H 19/0618; F16H 19/0622; F16H 19/0628; F16H 19/0636; F16H 19/064; F16H 19/0645; F16H 19/065; F16H 19/0654;
(Continued)

(56) References Cited

U.S. PATENT DOCUMENTS 182,199 A * 9/1876 Joslin ........................ B62M 1/14
74/165
2,688,232 A * 9/1954 Geyer ..................... F15B 11/22
74/89.17

(Continued)

FOREIGN PATENT DOCUMENTS

JP 07017694 A * 7/1993 ............... F16H 7/24

OTHER PUBLICATIONS

U.S. Appl. No. 18/204,268, filed May 31, 2023.

(Continued)

*Primary Examiner* — Joshua E Rodden
(74) *Attorney, Agent, or Firm* — Howard & Howard Attorneys PLLC

(57) ABSTRACT

A drive mechanism includes a stacked motor assembly. The stacked motor assembly includes a first motor, a first rotatable driver member rotationally fixed to the first motor, a second motor vertically spaced from the first motor, and a second rotatable driver member rotationally fixed to the second motor. The drive mechanism also includes an output shaft spaced from the first motor and the second motor and a flexible drive member rotatably coupling the first rotatable driver member, the second rotatable driver member, and the output shaft together such that rotation of the first rotatable drive member by the first motor and rotation of the second rotatable driver member by the second motor impart rotational torque to the output shaft. The drive mechanism further includes an output belt fixed to the output shaft and configured to be wound about the output shaft upon rotation of the output shaft.

20 Claims, 5 Drawing Sheets

(58) Field of Classification Search
CPC ............. F16H 19/0659; F16H 19/0663; F16H 19/0672; F16H 19/08; F16H 2019/0609; F16H 2019/0613; F16H 2019/0668; F16H 2019/0677; F16H 2019/0681; F16H 2019/0686; F16H 2019/069; F16H 2019/0695; F16H 2019/085; B66F 3/44
USPC ..................... 242/370; 74/89.2, 89.21, 89.22
See application file for complete search history.

(56) References Cited

U.S. PATENT DOCUMENTS 3,785,462 A * 1/1974 Coad ........................ B66F 7/065 187/269
5,198,736 A * 3/1993 Azuma .................... B25J 9/041 901/17
5,395,209 A * 3/1995 Busse ....................... B66F 7/02 187/269
5,539,987 A * 7/1996 Zennyoji ................. F16H 19/06 346/139 B
7,281,447 B2 * 10/2007 Gosselin .................... B25J 9/04 74/89.22
7,413,056 B2 * 8/2008 Gonzi ..................... B66F 7/065 187/269
8,662,477 B2 3/2014 Bacon
8,714,524 B2 5/2014 Bacon
8,733,508 B2 5/2014 Bacon
9,340,398 B2 * 5/2016 Ruth ....................... B66F 7/065
9,422,142 B2 8/2016 Bacon et al.
9,664,263 B2 * 5/2017 Nawrocki ............... F16H 19/06
10,072,743 B1 * 9/2018 Wittig ................. F16H 19/0618
11,655,100 B2 5/2023 Scarth
2007/0155559 A1 * 7/2007 Horst .................... F16H 19/005 474/134
2007/0155560 A1 * 7/2007 Horst .................... F16H 19/006 474/134
2014/0076082 A1 * 3/2014 Saji ......................... F16G 13/20 74/422
2021/0116006 A1 * 4/2021 Kabai ...................... B66D 3/04

OTHER PUBLICATIONS

U.S. Appl. No. 18/204,280, filed May 31, 2023.
U.S. Appl. No. 18/204,290, filed May 31, 2023.
U.S. Appl. No. 63/347,311, filed May 31, 2022.

* cited by examiner

DRIVE MECHANISM

CROSS-REFERENCE TO RELATED APPLICATIONS

The subject patent application claims priority to and all the benefits of U.S. Provisional Patent Application No. 63/406,111 which was filed on Sep. 13, 2022, which is herein incorporated by reference in its entirety.

BACKGROUND OF THE INVENTION

1. Field of the Invention

The invention generally relates to a drive mechanism.

2. Description of the Related Art

Drive mechanisms commonly include one or more electric motors which provide rotational torque to an output shaft. The rotational torque generated by the drive mechanisms is used to provide power for a variety of applications. Often, the applications require significant power which necessitate drive mechanisms capable of generating significant power. To generate significant power, the electric motors are commonly required to be burdensomely large, and thus expensive. Moreover, the applications requiring significant power often also have spatial limitations in the environment in which they operate, which necessitates the drive mechanisms to be compact. The drive mechanisms thus struggle to generate significant power when spatially limited.

As such, there remains a need to provide an improved drive mechanism.

SUMMARY OF THE INVENTION AND ADVANTAGES

A drive mechanism includes a stacked motor assembly. The stacked motor assembly includes a first motor, a first rotatable driver member rotationally fixed to the first motor, a second motor vertically spaced from the first motor, and a second rotatable driver member rotationally fixed to the second motor. The drive mechanism also includes an output shaft spaced from the first motor and the second motor and a flexible drive member rotatably coupling the first rotatable driver member, the second rotatable driver member, and the output shaft together such that rotation of the first rotatable drive member by the first motor and rotation of the second rotatable driver member by the second motor impart rotational torque to the output shaft. The drive mechanism further includes an output belt fixed to the output shaft and configured to be wound about the output shaft upon rotation of the output shaft.

Accordingly, the drive mechanism is able to generate significant power while also being compact. As such, the drive mechanism is suitable for applications which require significant power in environments that are spatially limited.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
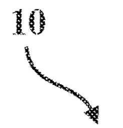
FIG. 1 is a partially schematic perspective view of the drive mechanism.
Figure 1:
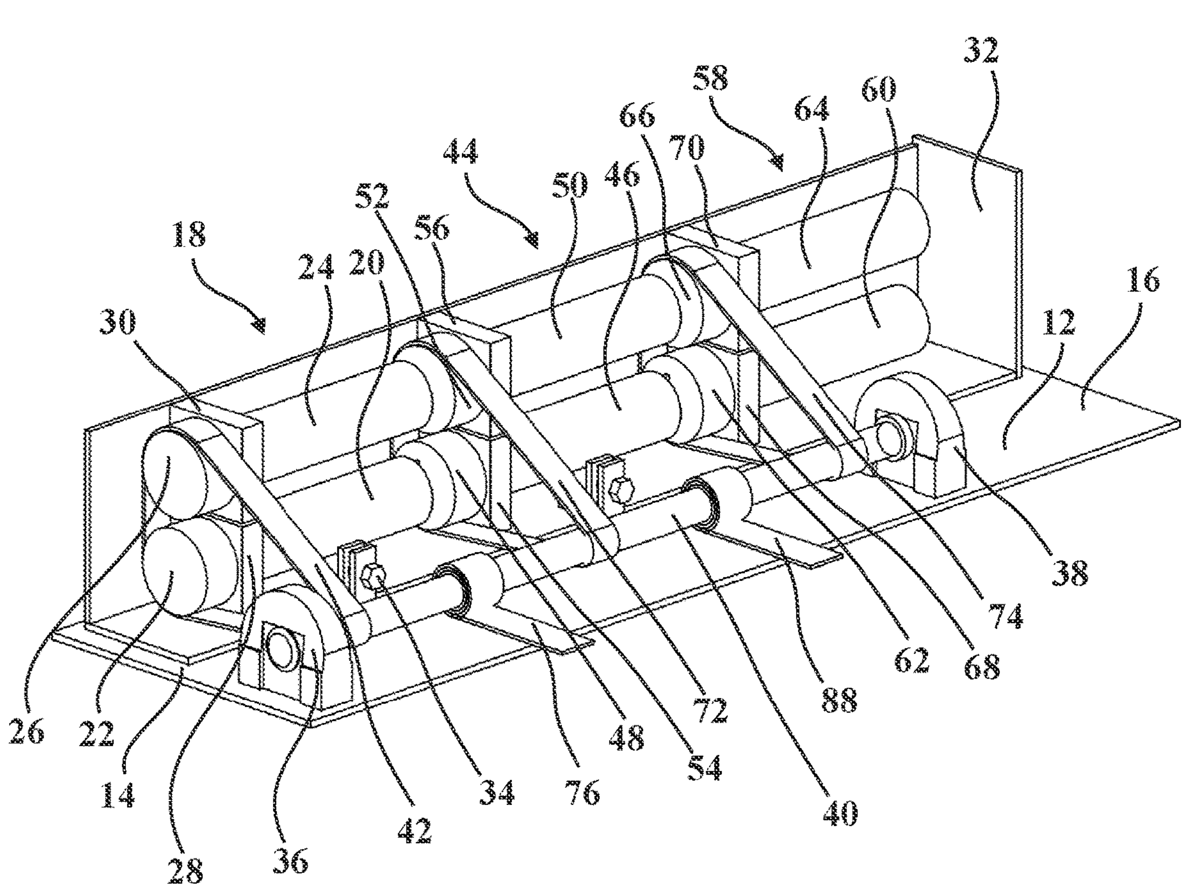

With reference to the Figures, wherein like numerals indicate like parts throughout the several views, a drive mechanism 10 is shown in FIGS. 1-5. The drive mechanism 10 includes a stacked motor assembly 18. The stacked motor assembly 18 includes a first motor 20, a first rotatable driver member 22 rotationally fixed to the first motor 20, a second motor 24 vertically spaced from the first motor 20, and a second rotatable driver member 26 rotationally fixed to the second motor 24. The drive mechanism 10 also includes an output shaft 40 spaced from the first motor 20 and the second motor 24 and a flexible drive member 42 rotatably coupling the first rotatable driver member 22, the second rotatable driver member 26, and the output shaft 40 together such that rotation of the first rotatable drive member 22 by the first motor 20 and rotation of the second rotatable driver member 26 by the second motor 24 impart rotational torque to the output shaft 40. The drive mechanism 10 further includes an output belt 76 fixed to the output shaft 40 and configured to be wound about the output shaft 40 upon rotation of the output shaft 40.

Accordingly, the drive mechanism 10 is able to generate significant power while also being compact. As such, the drive mechanism 10 is suitable for applications which require significant power in environments that are spatially limited.

The drive mechanism 10 may further include a support 12 coupled to the stacked motor assembly 18. The first motor 20 may be adjacent to the support 12, and the second motor 24 may be vertically spaced from the support 12 such that the first motor 20 is disposed between the second motor 24 and the support 12. Although not required, as shown in FIGS. 1-5, the support 12 may be a bottom plate 12. The stacked motor assembly 18 may also include a first mount block 28 supporting the first motor 20 and the first rotatable driver member 22 and a second mount block 30 supporting the second motor 24 and the second rotatable driver member 26. The first mount block 28 may be disposed between the first motor 20 and the first rotatable driver member 22, and the second mount block 30 may be disposed between the second motor 24 and the second rotatable driver member 26.

In a non-limiting example, the motors 20, 24 may each be electric motors. More specifically, the motors 20, 24 may each be stepper motors. The motors 20, 24 may each include a motor housing, a stator disposed within the motor housing, and a rotor disposed within the stator. Each motor 20, 24 may be fixed to its corresponding mount block 28, 30. More specifically, the housing of the first motor 20 may be fixed to the first mount block 28, and the housing of the second motor 24 may be fixed to the second mount block 30.

The drive mechanism 10 may further include a plurality of motor shafts each rotationally fixed to one of the rotors of the motors 20, 24 and rotationally fixed to one of the rotatable driver members 22, 26. In a non-limiting example, each motor shaft may be keyed, or splined, to one of the rotatable driver members 22, 26 to rotationally fix the motor shaft to one of the rotatable driver members 22, 26. In other non-limiting examples, each motor shaft may be welded, brazed, soldered, or otherwise physically joined with one of the rotatable driver members 22, 26, each motor shaft may be integral with one of the rotatable driver members 22, 26, in a non-limiting example each motor shaft may be formed integrally with one of the rotatable driver members 22, 26 such as but not limited to by casting.

The motors 20, 24 of the stacked motor assembly may be powered by alternating current or direct current. Moreover, the arrangement of the motors 20, 24 does not present any electric and magnetic field concerns that would prevent the motors 20, 24 from successful operation. More specifically, because the relative energy usage of each motor 20, 24 is relatively low, the total flux generated by the motors 20, 24 is insufficient is cause malfunction of adjacent motors 20, 24. Therefore, the motors 20, 24 may be arranged relatively closely to one another. For example, a gap may be defined between adjacent motors 20, 24. The gap may be between 0.1 inches and 3 inches, may be between 0.25 inches and 2 inches, may be between 0.25 inches and 1.5 inches, may be between 0.25 inches and 1.25 inches, and may be between 0.25 inches and 1 inch.

Figure 2:
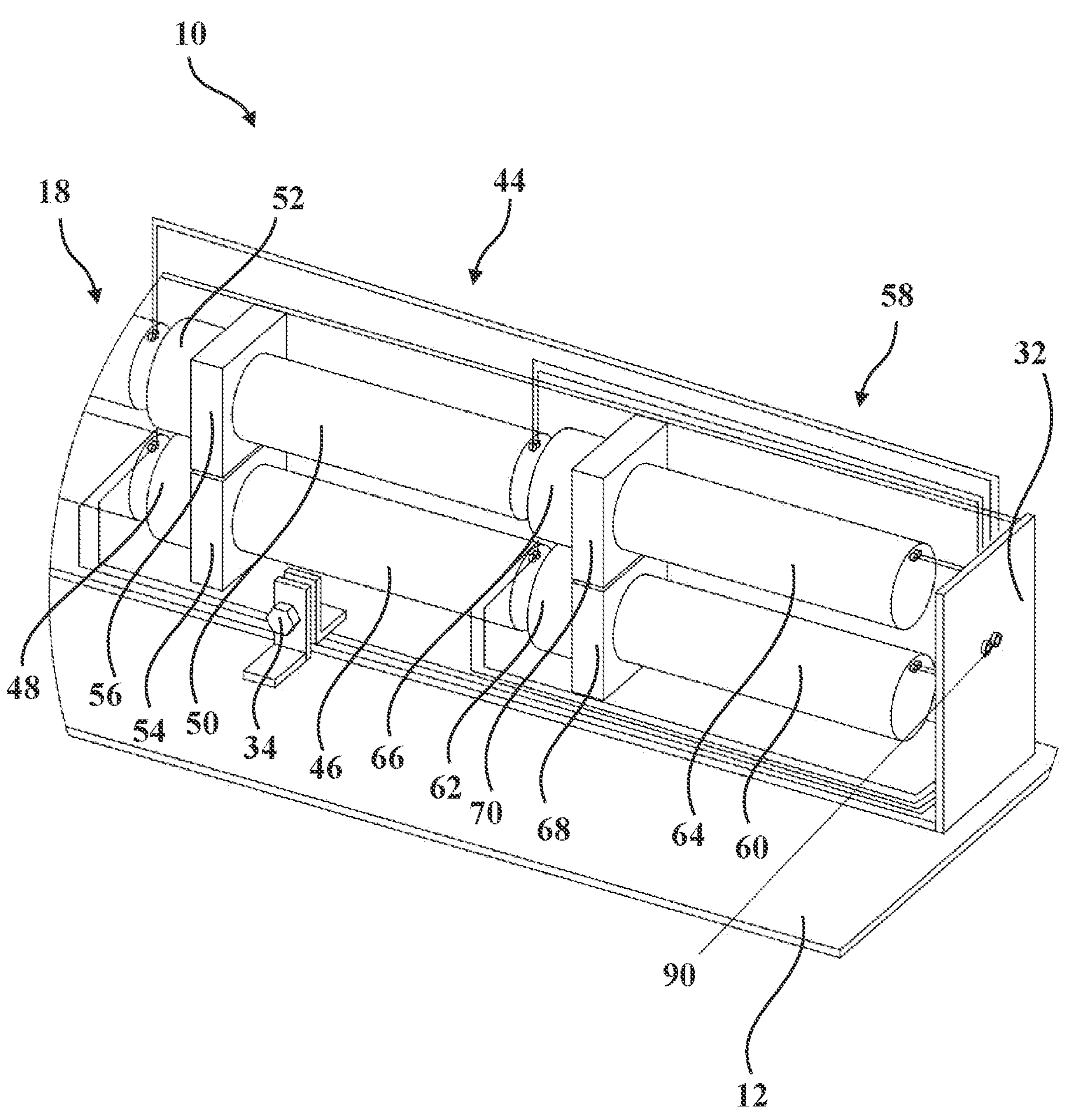
FIG. 2 is another partially schematic perspective view of the drive mechanism of FIG. 1.

As shown in FIG. 2, the stacked motor assembly(s) 18 may further include a housing 32 disposed about the motors 20, 24. The housing 32 may define holes 90 to permit sources of electrical energy (e.g., wires) to extend through the housing 32 and power the motors 20, 24. Alternatively, it is contemplated that the drive mechanism 10 may include a battery disposed in the housing 32 to power the motors 20, 24. The stacked motor assembly(s) 18 may also include an adjustment bolt 34 coupled to the housing 32 to tighten the motor(s) 20, 24. The housing may be welded together from various plates. Moreover, the first mount block 28 and the second mount block 30 may be fixed to the housing 32.

Each motor shaft associated with its corresponding motor 20, 24 may extend through a bore defined by the corresponding mount block 28, 30. Moreover, the drive mechanism 10 may include a bearing disposed in the bore for supporting rotation of the motor shaft. The bearing may be a ball bearing, a roller bearing such as but not limited to a needle bearing, or a plain bearing, among other possibilities. It is to be appreciate that the drive mechanism 10 may include a plurality of bearings, each disposed in one bore defined by one of the mount blocks 28, 30.

Figure 4:
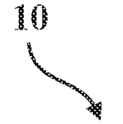
FIG. 4 is a partially schematic top view of the drive mechanism of FIGS. 1-3.
Figure 4:
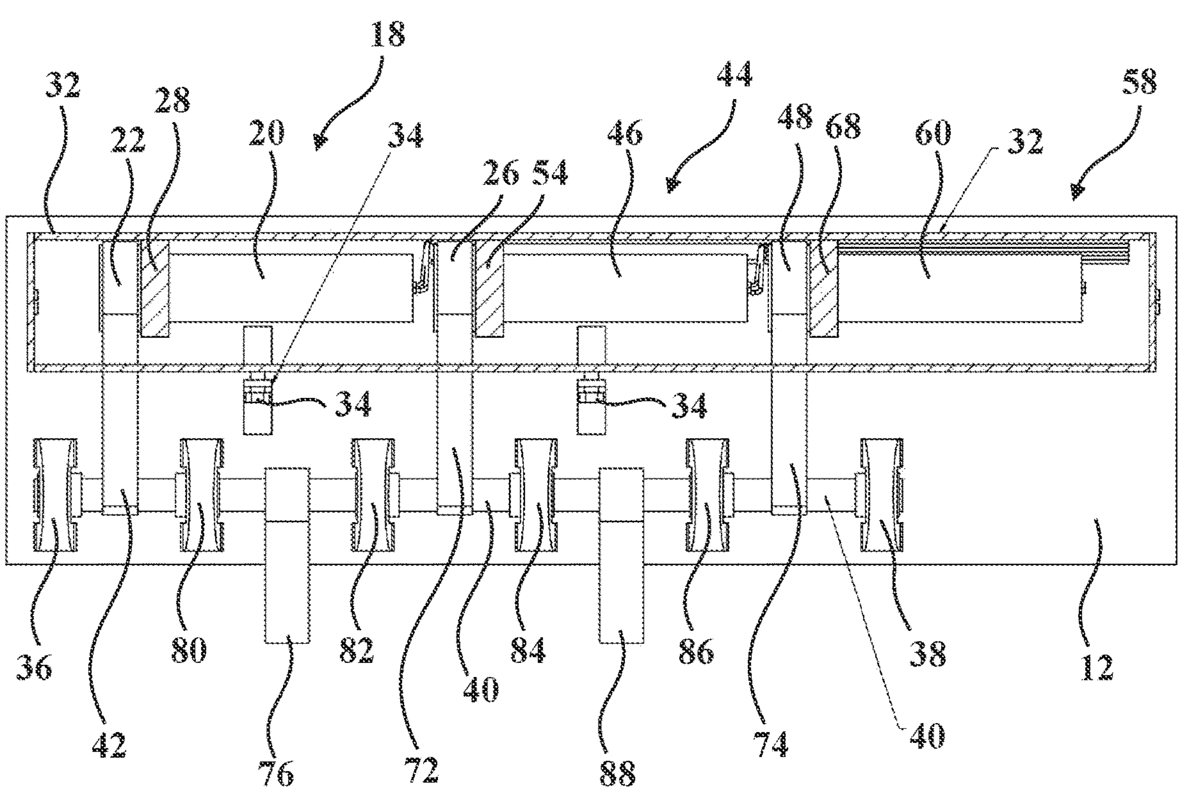

The drive assembly may further include a first bearing 36 coupled to the support 12 and a second bearing 38 coupled to the support 12 and spaced from the first bearing 36. The output shaft 40 is rotatably supported by the first bearing 36 and the second bearing 38. Although not required, the first bearing 36 may be a first pillow block 36 and the second bearing 38 may be a second pillow block 38. More specifically, the output shaft 40 may be rotatably supported by the first bearing 36 on one end of the output shaft 40 and the second bearing 38 on the other end of the output shaft 40. As shown in FIG. 4, the drive mechanism 10 may also include a third bearing 80 rotatably supporting the output shaft 40, a fourth bearing 82 rotatably supporting the output shaft 40, a fifth bearing 84 rotatably supporting the output shaft 40, and/or a sixth bearing 86 rotatably supporting the output shaft 40. More than six bearings are also contemplated. The third bearing 80 may be a third pillow block 80, the fourth bearing 82 may be a fourth pillow block 82, the fifth bearing 84 may be a fifth pillow block 86, and the sixth bearing 86 may be a sixth pillow block 86.

Figure 3:
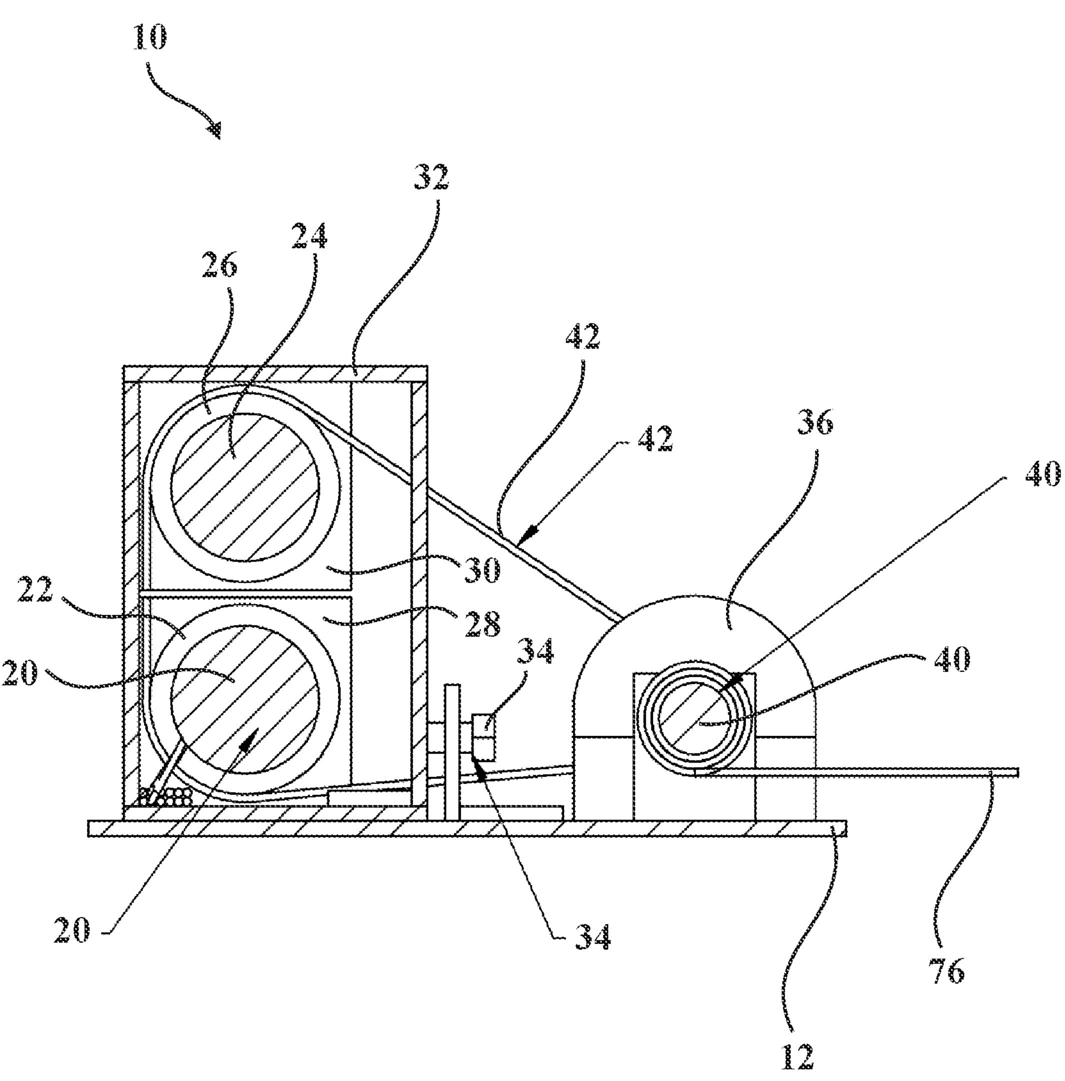
FIG. 3 is a partially schematic side view of the drive mechanism of FIGS. 1 and 2.

As shown in FIGS. 1, 3, and 4, the drive mechanism 10 further includes a flexible drive member 42 rotatably coupling the first rotatable driver member 22, the second rotatable driver member 26, and the output shaft 40 together such that rotation of the first rotatable driver member 22 by the first motor 20 and rotation of the second rotatable driver member 26 by the second motor 24 impart rotational torque to the output shaft 40. The flexible drive member 42 may be a belt, including but not limited to a serpentine belt. In the embodiments where the flexible drive member 42 is a belt, the first rotatable driver member 22 may be a pulley and the second rotatable driver member 26 may be a pulley. The belt may have a friction element such as ridges, bumps, teeth, or the like on the underside of the belt (not shown), and the pulleys may have corresponding friction elements such as ridges, bumps, teeth, or the like (not shown). Alternatively, the flexible drive member 42 may be a chain, including but not limited to a roller chain. In the embodiments where the flexible drive member 42 is a chain, the first rotatable driver member 22 may be a sprocket and the second rotatable driver member 26 may be a sprocket.

Although not required, the output shaft 40 may have a rotatable driven member rotationally fixed to the output shaft 40. The rotatable driven member may have a diameter different than a diameter of the output shaft 40. The rotatable driven member may be rotationally coupled to the flexible drive member 42 such that rotational torque is imparted from the flexible drive member 42, to the rotatable driven member, and to the output shaft 40. It is to be appreciated that the rotatable driven member may be integral with the output shaft 40 itself. The first motor 20, the first rotatable driver member 22, the second motor 24, and the second rotatable driver member 26 may be aligned along a common vertical plane. Moreover, the output shaft 40 may be offset from the common vertical plane.

It is to be appreciated that the drive mechanism 10 may include more than one stacked motor assembly 18, as shown in FIG. 1. In other words, the drive mechanism 10 may include a plurality of stacked motor assemblies 18. Each stacked motor assembly 18 may be disposed in the same housing 32 or within corresponding separate housings. In non-limiting examples, the drive mechanism 10 may include two stacked motor assemblies 18, three stacked motor assemblies 18, four stacked motor assemblies 18, or more than four stacked motor assemblies 18. Although not required, the two stacked motor assemblies 18 may be spaced from one another along the axis, the three stacked motor assemblies 18 may be spaced from one another along the axis, the four stacked motor assemblies 18 may be spaced from one another along the axis, and more than four stacked motor assemblies 18 may be spaced from one another along the axis.

Regardless of the number of stacked motor assemblies 18, each stacked motor assembly 18 includes a first motor 20 adjacent to the bottom plate 12, a first rotatable driver member 22 rotationally fixed to the first motor 20, a second motor 24 spaced from the bottom plate 12 such that the first motor 20 is disposed between the second motor 24 and the bottom plate 12, and a second rotatable driver member 26 rotationally fixed to the second motor 24.

In a non-limiting example, in the embodiments with two stacked motor assemblies 18, a first stacked motor assembly 18 may include the first motor 20, the first rotatable driver member 22, the second motor 24, and the second rotatable driver member 26, and optionally may include the first mount block 28 and the second mount block 30. Additionally, in the embodiments with two stacked motor assemblies 18, the drive mechanism 10 may include a second stacked motor assembly 44 including a third motor 46 adjacent to the bottom plate 12, a third rotatable driver member 48 rotationally fixed to the third motor 46, a fourth motor 50 spaced from the bottom plate 12 such that the third motor 46 is disposed between the fourth motor 50 and the bottom plate 12, and a fourth rotatable driver member 52 rotationally fixed to the fourth motor 50. The second stacked motor assembly 44 may optionally also include a third mount block 54 and a fourth mount block 56 having the characteristics of the first mount block 28 and the second mount block 30 as described herein. The first stacked motor assembly 18 and the second stacked motor assembly 44 may be disposed in a common housing 32 and aligned in a common plane.

In another non-limiting example, in the embodiments with three stacked motor assemblies 18, the first stacked motor assembly 18 may include the components as described above and herein, the second stacked motor assembly 44 may include the components as described above and herein, and a third stacked motor assembly 58 may include a fifth motor 60 adjacent to the bottom plate 12, a fifth rotatable driver member 62 rotationally fixed to the fifth motor 60, a sixth motor 64 spaced from the bottom plate 12 such that the fifth motor 60 is disposed between the sixth motor 64 and the bottom plate 12, and a sixth rotatable driver member 66 rotationally fixed to the sixth motor 64. The third stacked motor assembly 58 may optionally also include a fifth mount block 68 and a sixth mount block 70 having the characteristics of the first mount block 28 and the second mount block 30 as described herein. The first stacked motor assembly 18, the second stacked motor assembly 44, and the third stacked motor assembly 58 may be disposed in a common housing 32 and aligned in a common plane. Moreover, the first motor 20, the third motor 46, and the fifth motor 60 may be coaxially arranged, and the second motor 24, the fourth motor 50, and the sixth motor 64 may be coaxially arranged.

In the embodiments with four stacked motor assemblies, it is to be appreciated that a fourth stacked motor assembly may include a seventh motor, a seventh rotatable driver member, an eighth motor, and an eighth rotatable driver member, and optionally a seventh mount block and an eight mount block, which interact as described above for the other stacked motor assemblies 18.

In the embodiments with two stacked motor assemblies 18, the flexible drive member 42 may be further defined as a first flexible drive member 42 which imparts a first rotational torque to the output shaft 40, and the drive mechanism 10 may include a second flexible drive member 72 rotatably coupling the third rotatable driver member 48, the fourth rotatable driver member 52, and the output shaft 40 together such that rotation of the third rotatable driver member 48 by the third motor 46 and rotation of the fourth rotatable driver member 52 by the fourth motor 50 impart a second rotational torque to the output shaft 40. Moreover, the rotatable driven member may be further defined as a first rotatable driven member, and the drive mechanism 10 may include a second rotatable driven member having the characteristics of the first rotatable driven member as described herein.

In the embodiments with three stacked motor assemblies 18, the drive mechanism 10 may have the first stacked motor assembly 18, the first flexible drive member 42, the second stacked motor assembly 44, and the second flexible drive member 72 as described above and herein, and may also include a third flexible drive member 74 rotatably coupling the fifth rotatable driver member 62, the sixth rotatable driver member 66, and the output shaft 40 together such that rotation of the fifth rotatable driver member 62 by the fifth motor 60 and rotation of the sixth rotatable driver member 66 by the sixth motor 64 impart a third rotational torque to the output shaft 40. Moreover, the drive mechanism 10 may include a third rotatable driven member having the characteristics of the first rotatable driven member and the second rotatable driven member as described herein.

The first rotational torque imparted to the output shaft 40 by the first stacked motor assembly 18 and the first flexible drive member 42, the second rotational torque imparted to the output shaft 40 by the second stacked motor assembly 44 and the second flexible drive member 72, and the third rotational torque imparted to the output shaft 40 by the third stacked motor assembly 58 and the third flexible drive member 74 may be additive to one another. In this way, the first motor 20, the second motor 24, the third motor 46, and fourth motor 50, the fifth motor 60 and the sixth motor 64 may all cooperate to impart rotational torque to the output shaft 40.

Although not required, the rotatable driver member(s) 22, 26, 48, 52, 62, 66 may have a diameter that is different than the diameter of the output shaft 40 and/or the diameter of the driven member(s) of the output shaft 40. In a non-limiting example, the diameter of the rotatable driver member(s) 22, 26, 48, 52, 62, 66 may be greater than the diameter of the output shaft 40 and/or the diameter of the driven member(s) of the output shaft 40. Alternatively, the diameter of the rotatable driver member(s) 22, 26, 48, 52, 62, 66 may be less than the diameter of the output shaft 40 and/or the diameter of the driven member(s) of the output shaft 40. As a non-limiting example, the first rotatable driver member 22 has a first diameter, the second rotatable driver member 26 has a second diameter, and the output shaft 40 has a third diameter less than the first diameter and the second diameter.

When above or below 1:1, the gear ratio between the diameter of the rotatable driver member(s) 22, 26, 48, 52, 62, 66 relative to the diameter of the output shaft 40 and/or the diameter of the driven member(s) of the output shaft 40 results in either a gear reduction or a gear overdrive. A gear reduction reduces the rotational speed of the output shaft 40 relative to the rotatable driver member(s) 22, 26, 48, 52, 62, 66 while increasing the torque of the output shaft 40 relative to the rotatable driver member(s) 22, 26, 48, 52, 62, 66. A gear overdrive increases the rotational speed of the output shaft 40 relative to the rotatable driver member(s) 22, 26, 48, 52, 62, 66 while decreasing the torque of the output shaft 40 relative to the rotatable driver member(s) 22, 26, 48, 52, 62, 66.

As shown in FIGS. 1 and 3, the flexible drive member(s) 42, 72, 74 may extend about both rotatable driver members 22, 26 without extending between the rotatable driver members 22, 26. However, it is to be appreciated that the drive mechanism 10 may include an idler or tensioner functionally interposed between the rotatable driver members 22, 26 such that the flexible drive member(s) 42, 72, 74 extends between the rotatable driver members 22, 26.

It is also contemplated that the stacked motor assembly 18 may also include a third motor spaced from the second motor 24 such that the second motor 24 is disposed between the first motor 20 and the third motor. The stacked motor assembly 18 may also further include a fourth motor, fifth motor, and more than five motors stacked similarly. In embodiments where a single stacked motor assembly 18 has three or more motors, the flexible drive member 42 may be disposed between adjacent motors (e.g., the flexible drive member 42 may be disposed between the first motor 20 and the second motor 24, and between the second motor 24 and the third motor).

Figure 5:
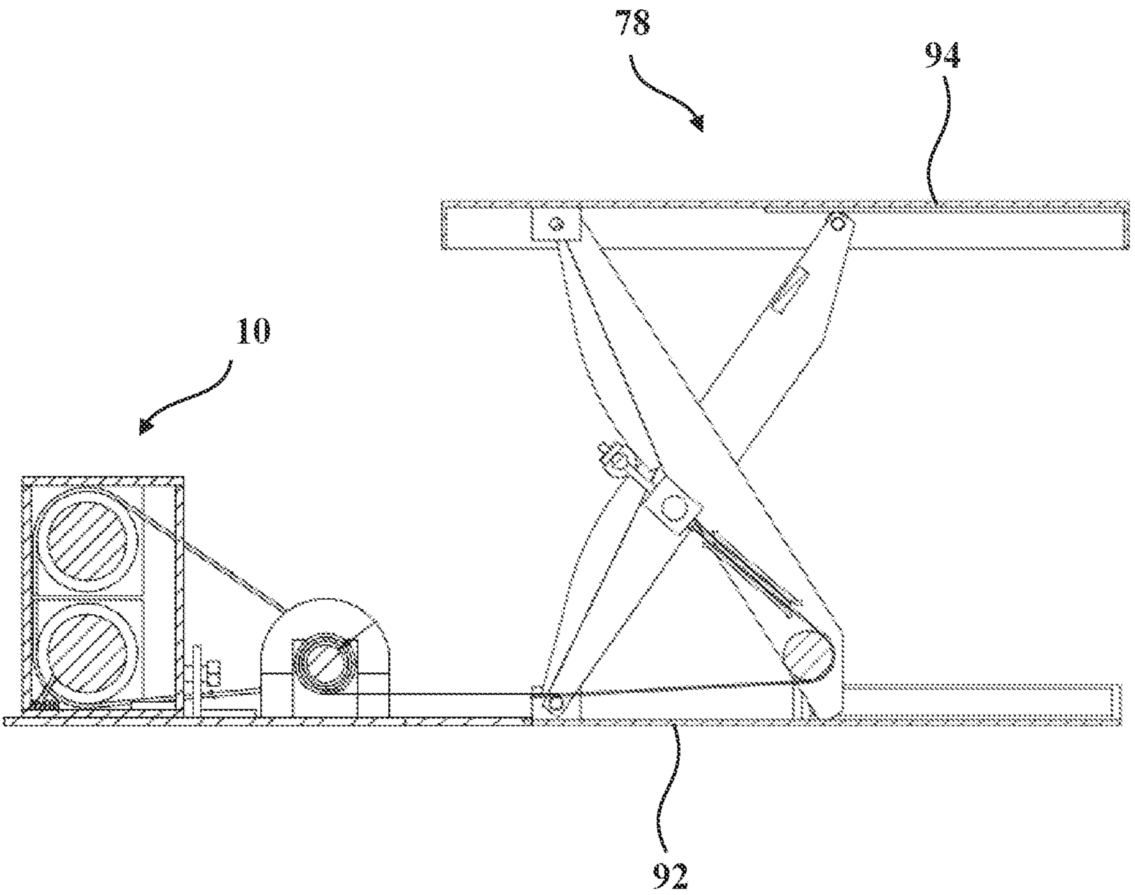
FIG. 5 is a partially schematic perspective view of the drive mechanism of FIGS. 1-4 integrated into a lift assembly, with the lift assembly in an elevated state.

The drive mechanism 10 may further include an output belt 76 fixed to the output shaft 40. Upon rotation of the output shaft 40, the output belt 76 may be wound about the output shaft 40. It is also to be appreciated that the drive mechanism 10 may include a second output belt 88 having the characteristics of the output belt 76 as described herein or may include a third output belt or more output belts. Although not required, the output belt(s) may be integrated into a transportation system such as a lift assembly 78, as shown in FIG. 5, for moving items or people between two vertically different locations (e.g., an elevated state and a lowered state). In other words, the drive mechanism 10 may further include the lift assembly 78 coupled to the output belt 76 such that rotation of the output shaft 40 winds the output belt 78 about the output shaft 40 and moves the lift assembly 78 between the elevated state and the lowered state. In a non-limiting example, as shown in FIG. 5, the lift assembly 78 is a scissor lift. The lift assembly 78 is shown in FIG. 5 as a scissor lift only for illustrative purposes, and the lift assembly 78 may be of any suitable configuration. Moreover, the drive mechanism 10 may include a plurality of wheels such that the drive mechanism 10 is portable.

More specifically, the lift assembly 78 may include a base 92 and a platform 94 coupled to the base 92. The platform 94 is moveable between a lowered state where the platform 94 is proximal to the base 92 and an elevated state where the platform 94 is distal to the base 92. The lift assembly 78 may include the drive mechanism 10 as described herein, including any embodiments and/or variations thereof. The output belt 76 may be fixed to the output shaft 40 and configured to be wound about the output shaft 40 upon rotation of the output shaft 40 to move the platform 94 between the lowered state and the elevated state.

The drive mechanism 10 may include a control system to synchronize the motors 20, 24, 46, 50, 60, 64. More specifically, the control system may synchronize the relative rotational speeds (e.g. RPM) of the first motor 20 and the second motor 24 within the same stacked motor assemblies 18. Moreover, the control system may synchronize the relative rotational speeds (e.g. RPM) between various motors 20, 24, 46, 50, 60, 64 of separate stacked motor assemblies 18. Additionally, the control system may be used as an electronic brake to lock the motor(s) 20, 24, 46, 50, 60, 64 and prevent rotation of the rotatable driver member(s) 22, 26, 48, 52, 62, 66.

The drive mechanism 10 may be configured to produce high torque at low rotations per minute (RPM) of the output shaft 40 and/or the rotatable driver member(s) 22, 26, 48, 52, 62, 66. For example, when integrated into the lift assembly 78, the drive mechanism 10 may exert sufficient torque to lift thousands of pounds. As another example, the RPM of the output shaft 40 may be between 1 RPM and 50 RPM, may be between 5 RPM and 40 RPM, may be between 10 RPM and 30 RPM, may be between 10 RPM and 20 RPM, and may be approximately 15 RPM.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A drive mechanism comprising;

a stacked motor assembly including, a first motor, a first rotatable driver member rotationally fixed to said first motor, a second motor vertically spaced from said first motor, and a second rotatable driver member rotationally fixed to said second motor;

an output shaft spaced from said first motor and said second motor;

a flexible drive member rotatably coupling said first rotatable driver member, said second rotatable driver member, and said output shaft together such that rotation of said first rotatable driver member by said first motor and rotation of said second rotatable driver member by said second motor impart rotational torque to said output shaft; and an output belt fixed to said output shaft and configured to be wound about said output shaft upon rotation of said output shaft.

2. The drive mechanism of claim 1, wherein said flexible drive member extends about said first rotatable driver member and said second rotatable driver member without extending between said first rotatable driver member and said second rotatable driver member.

3. The drive mechanism of claim 1, wherein said first rotatable driver member has a first diameter, wherein said second rotatable driver member has a second diameter, and wherein said output shaft has a third diameter less than said first diameter and said second diameter.

4. The drive mechanism of claim 1 further comprising a first mount block disposed between and supporting said first motor and said first rotatable driver member, and further comprising a second mount block disposed between and supporting said second motor and said second rotatable driver member.

5. The drive mechanism of claim 1, wherein a gap is defined between said first motor and said second motor, and wherein said gap is between 0.1 inches and 3 inches.

6. The drive mechanism of claim 1, wherein said first motor, said first rotatable driver member, said second motor, and said second rotatable driver member are aligned along a common vertical plane.

7. The drive mechanism of claim 6, wherein said output shaft is offset from said common vertical plane.

8. The drive mechanism of claim 1 further comprising a support coupled to said stacked motor assembly, wherein said first motor is adjacent to said support, and wherein said second motor is vertically spaced from said support such that said first motor is disposed between said second motor and said support.

9. The drive assembly of claim 8 further comprising a first bearing coupled to said support and a second bearing coupled to said support and spaced from said first bearing, wherein said output shaft is rotatably supported by said first bearing and said second bearing.

10. The drive mechanism of claim 1, wherein said output belt is further defined as a first output belt, and further comprising a second output belt fixed to said output shaft and configured to be wound about said output shaft upon rotation of said output shaft.

11. The drive mechanism of claim 1, wherein said flexible drive member is a belt.

12. The drive mechanism of claim 1, wherein said stacked motor assembly is further defined as a first stacked motor assembly, and further comprising a second stacked motor assembly including a third motor, a third rotatable driver member rotationally fixed to said third motor, a fourth motor vertically spaced from said third motor, and a fourth rotatable driver member rotationally fixed to said fourth motor.

13. The drive mechanism of claim 12, wherein said flexible drive member is further defined as a first flexible drive member, and further comprising a second flexible drive member rotatably coupling said third rotatable driver member, said fourth rotatable driver member, and said output shaft together such that rotation of said third rotatable driver member by said third motor and rotation of said fourth rotatable driver member by said fourth motor impart rotational torque to said output shaft.

14. The drive mechanism of claim 12 further comprising a third mount block disposed between and supporting said third motor and said third rotatable driver member, and further comprising a fourth mount block disposed between and supporting said fourth motor and said fourth rotatable driver member.

15. The drive mechanism of claim 12, wherein said first stacked motor assembly and said second stacked motor assembly are disposed in a common housing and are aligned in a common plane.

16. The drive mechanism of claim 12 further comprising a third stacked motor assembly including a fifth motor, a fifth rotatable driver member rotationally fixed to said fifth motor, a sixth motor vertically spaced from said fifth motor, and a sixth rotatable driver member rotationally fixed to said sixth motor.

17. The drive mechanism of claim 16 further comprising a third flexible drive member rotatably coupling said fifth rotatable driver member, said sixth rotatable driver member, and said output shaft together such that rotation of said fifth rotatable driver member by said fifth motor and rotation of said sixth rotatable driver member by said sixth motor impart rotational torque to said output shaft.

18. The drive mechanism of claim 16, wherein said first stacked motor assembly, said second stacked motor assembly, and said third stacked motor assembly are disposed in a common housing and are aligned in a common plane.

19. The drive mechanism of claim 16, wherein said first motor, said third motor, and said fifth motor are coaxially arranged, and wherein said second motor, said fourth motor, and said sixth motor are coaxially arranged.

20. A lift assembly comprising, a base;

a platform coupled to said base, said platform moveable between a lowered state where said platform is proximal to said base and an elevated state where said platform is distal to said base; and a drive mechanism including, a stacked motor assembly including, a first motor, a first rotatable driver member rotationally fixed to said first motor, a second motor vertically spaced from said first motor, and a second rotatable driver member rotationally fixed to said second motor;

an output shaft spaced from said first motor and said second motor;

a flexible drive member rotatably coupling said first rotatable driver member, said second rotatable driver member, and said output shaft together such that rotation of said first rotatable driver member by said first motor and rotation of said second rotatable driver member by said second motor impart rotational torque to said output shaft; and an output belt fixed to said output shaft and configured to be wound about said output shaft upon rotation of said output shaft to move said platform between said lowered state and said elevated state.

* * * * *